United States Patent [19]

Ozaki

[11] Patent Number: 5,729,350

[45] Date of Patent: Mar. 17, 1998

[54] USING INFORMATION ON AN INPUT SHEET TO CHANGE APPARATUS SETTINGS

[75] Inventor: Hidenori Ozaki, Kawasaki, Japan

[73] Assignee: Canon Kabushiki Kaisha, Tokyo, Japan

[21] Appl. No.: 574,924

[22] Filed: Dec. 19, 1995

[30] Foreign Application Priority Data

Dec. 20, 1994 [JP] Japan ................... 6-316484

[51] Int. Cl.$^6$ ................................. G03G 15/00
[52] U.S. Cl. ........................... 358/296; 399/84
[58] Field of Search ..................... 358/296; 399/9, 399/18, 38, 72, 84, 138; 382/317

[56] References Cited

U.S. PATENT DOCUMENTS

| | | | |
|---|---|---|---|
| 4,248,528 | 2/1981 | Sahay | 399/84 |
| 4,716,438 | 12/1987 | Farrell | 399/84 |
| 4,763,161 | 8/1988 | Forest et al. | 399/84 |
| 4,847,656 | 7/1989 | Kuno et al. | 399/84 |
| 4,944,031 | 7/1990 | Yoshino et al. | 399/19 |
| 4,970,554 | 11/1990 | Rourke | 399/84 |
| 4,987,447 | 1/1991 | Ojha | 399/84 |
| 5,051,779 | 9/1991 | Hikawa | 399/84 |
| 5,235,396 | 8/1993 | Ito et al. | 399/84 |
| 5,296,896 | 3/1994 | Nisiyama et al. | 399/46 |
| 5,418,865 | 5/1995 | Bloomberg | 382/312 |
| 5,428,694 | 6/1995 | Betts et al. | 382/317 |
| 5,434,933 | 7/1995 | Karnin et al. | 382/317 |
| 5,452,379 | 9/1995 | Poor | 382/317 |

*Primary Examiner*—Peter S. Wong
*Assistant Examiner*—Gregory J. Toatley, Jr.
*Attorney, Agent, or Firm*—Fitzpatrick, Cella, Harper & Scinto

[57] ABSTRACT

An object of the present invention is to provide an image processing apparatus which can easily and accurately change the setting contents of the apparatus. The image processing apparatus reads data from an information inputting sheet, and setting means discriminates the data read by the reading means. A predetermined setting item is set on the basis of the discriminated data, and an information inputting sheet on which the data set by the setting means is marked, is output.

21 Claims, 6 Drawing Sheets

USING INFORMATION ON AN INPUT SHEET TO CHANGE APPARATUS SETTINGS

BACKGROUND OF THE INVENTION

1. Field of the Invention

The present invention relates to an image processing apparatus, and more particularly to an image processing apparatus of which the setting contents can be easily changed.

2. Related Background Art

Hitherto, in this kind of apparatus, for example, in a copying machine, an apparatus having a service mode in which settings are adjusted by a service man, and a user mode in which settings are selected by a user or the like, has already been known. Ordinarily, in the service mode, the setting of data or the like concerning an image formation, such as an adjustment of the potential of a charging device, to be adjusted by a professional service man is performed. In the user mode, the setting of an operation condition of the apparatus in an initial state when the apparatus is powered on to be preferably selected by an user is performed. The setting is generally performed by using hard keys, a touch panel, dip switches or the like provided in a console unit.

However, due to improvements and enhancements of various functions of the recent apparatus, the number and frequency of adjustments by service personnel and of settings by the user tend to increase, and therefore, there conventionally occurs a problem in that operation becomes complex in a case where an operation is conducted in a console unit or the like, Therefore, the setting or change of every kind of setting item cannot be accurately and quickly performed. That is, in proportion to increasing of setting items, there results the spending of a long time for setting items.

SUMMARY OF THE INVENTION

The present invention, made in consideration of the above-mentioned conventional problem, is applied in order to solve this problem, and an object is to improve a conventional image processing apparatus.

Another object of the present invention is to provide an image processing apparatus which can easily and accurately change the setting contents of the apparatus.

Still another object of the present invention is to provide an image processing apparatus which can easily change the setting contents of the apparatus without incurring a serious rise in cost.

The above-mentioned objects and other objects and features of the present invention will become more fully apparent from the following detailed description based on the attached drawings.

DETAILED DESCRIPTION OF THE PREFERRED EMBODIMENT

An embodiment of the present invention will be described in detail hereinafter based on the attached drawings.

Figure 1:
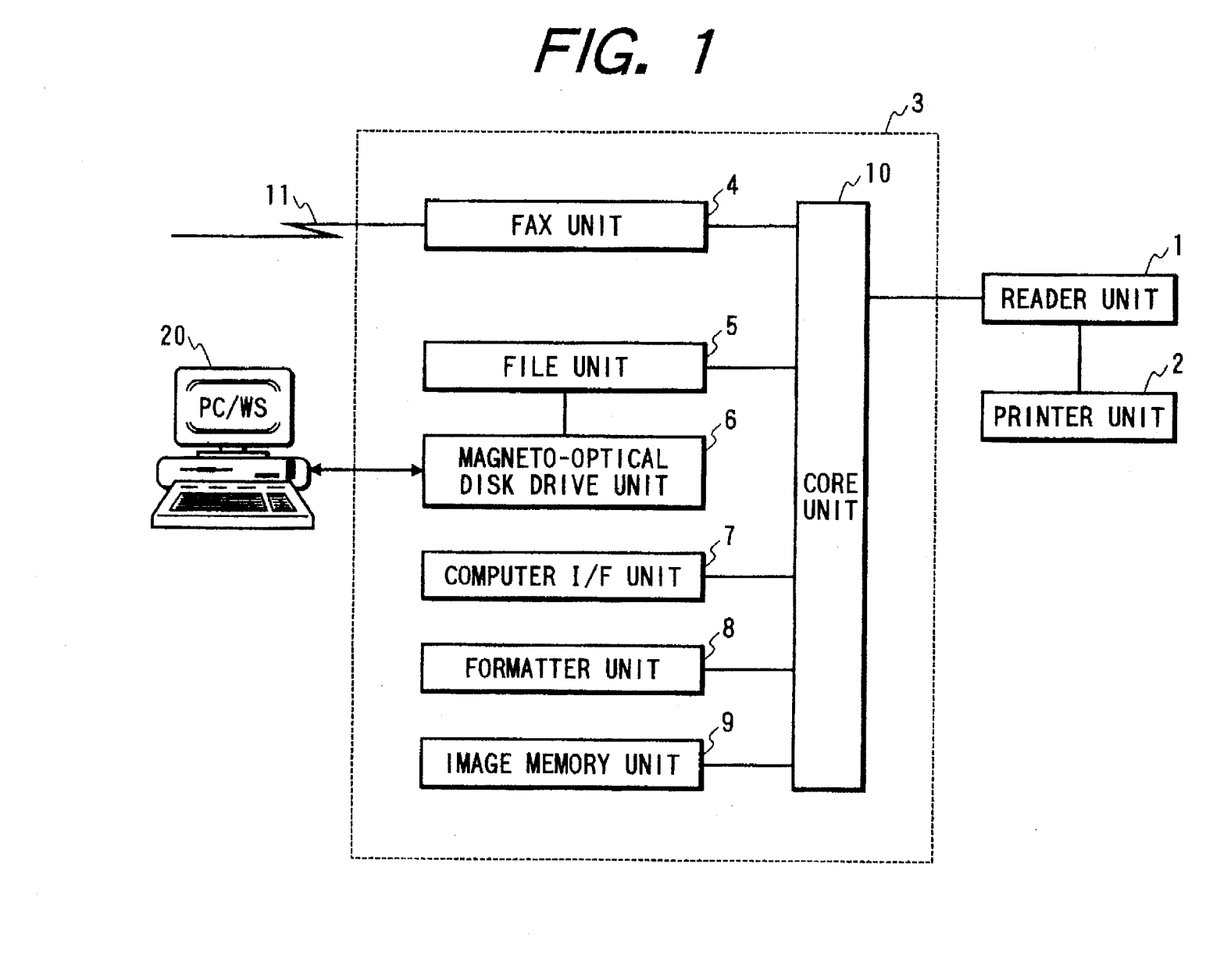
FIG. 1 is a block diagram showing an outline of the structure of an image processing apparatus according to an embodiment of the present invention.

FIG. 1 is a block diagram showing an outline of the structure of an image processing apparatus according to an embodiment of the present invention.

In FIG. 1, a reader unit 1 reads an image of an original (or original document) to output image data (bit-map digital data) responding to an original image to a printer unit 2 and an image input/output control unit 3. The printer unit 2 which has a cassette for separately storing plural kinds of media to be recorded (called a record sheet (paper) hereinafter) records and outputs an image responding to image data from the reader unit 1 and the image input/output control unit 3 on a record paper as a visual image according to a print command. The image input/output control unit 3 connected to the reader unit 1 is composed of a facsimile unit 4, a file unit 5 or a magneto-optical disk drive unit 6 to be connected to the file unit 5, a computer interface unit 7 which connects the image input/output control unit 3 to an external computer 20, a formatter unit 8 which forms a visual image from information transmitted from the external computer 20, an image memory unit 9 for temporarily storing information which is input from the reader unit 1 or from the external computer 20 through a core unit 10, and the core unit 10 for functionally controlling each of the foregoing units.

The facsimile unit 4 expands compressed image data received through a telephone line 11 to transfer expanded image data to the core unit 10, and compresses image data transferred from the core unit 10 to transmit compressed image data through the telephone line 11. The file unit 5, to which the magneto-optical disk drive unit 6 is connected, compresses image data transferred from the core unit 10 for storing it together with key words, which searches thus compressed image data, in a magneto-optical disk set in the magneto-optical disk drive unit 6. The file unit 5 searches compressed image data stored in the magneto-optical disk based on key words transferred through the core unit 10 and reads searched compressed image data to expand it for transferring the expanded image data to the core unit 10. The computer interface unit 7 is an interface between a personal computer or work station (PC/WS) 20 and the core unit 10. The formatter unit 8 develops code data which represents an image transferred from the PC/WS 20 into image data which can be recorded in the printer unit 2. The image memory unit 9 temporarily stores data transferred from each unit. Althogh the core unit 10 will be described later, it controls a data flow among each of the reader unit 1, the facsimile unit 4, the file unit 5, the computer interface unit 7, the formatter unit 8 and the image memory unit 9.

Figure 2:
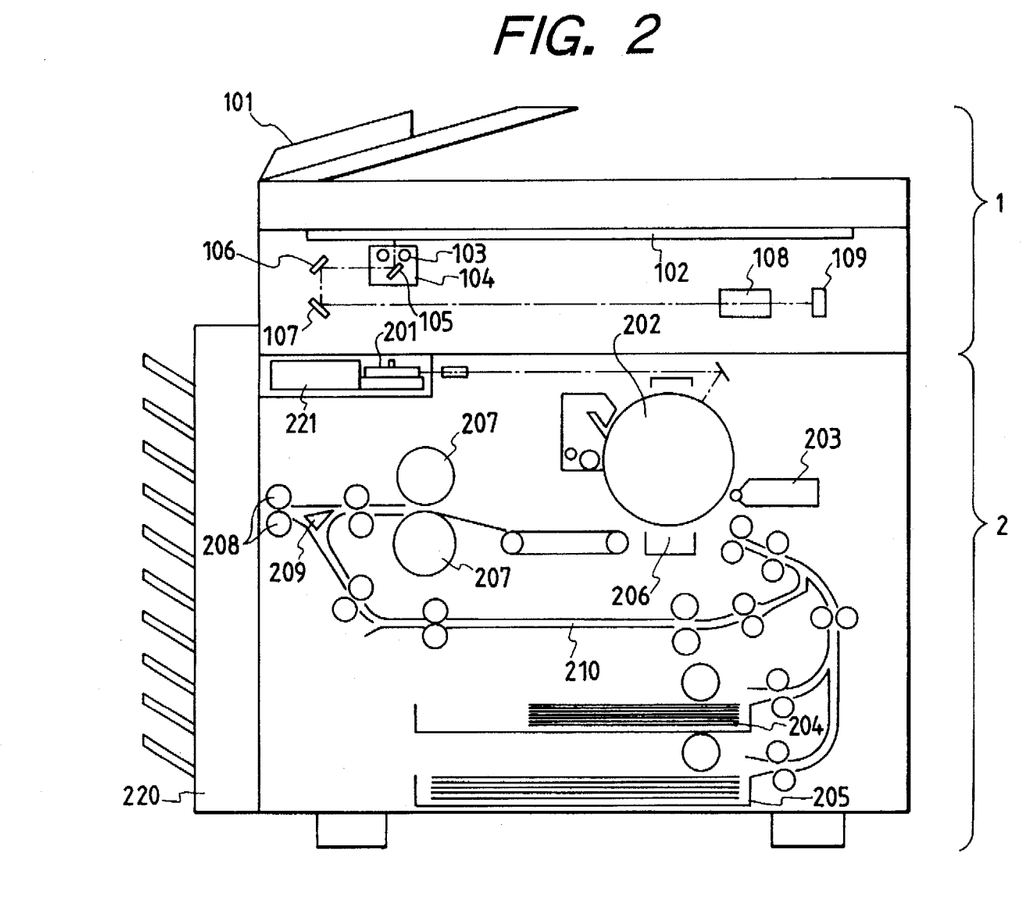
FIG. 2 is a cross-sectional view of a reader unit and a printer unit.

FIG. 2 is a cross-sectional view of the reader unit 1 and the printer unit 2. An original feeder 101 of the reader unit 1 feeds originals set with face-up state onto a platen glass 102 one by one from a final page and discharges an original which is on the platen glass after finishing an operation of reading the original. When an original is conveyed on the platen glass 102, a lamp 103 is lighted to start the moving of a scanner unit 104 for exposure scanning an original. At this time, the reflection light from the original is introduced to a CCD image sensor 109 (called a CCD hereinafter) by mirrors 105, 106 and 107 and a lens 108. In this manner, a scanned original image is read by the CCD 109. Image data which is output from the CCD 109 is transferred to the printer unit 2 and the core unit 10 of the image input/output control unit 3 after being executed a predetermined process.

A laser driver 221 of the printer unit 2 drives a laser radiation unit 201 such that the laser radiation unit 201 radiates a laser beam responding to image data which is output from the reader unit 1. This laser beam is irradiated onto a photosensitive drum 202 on which a latent image responding to the laser beam is formed. The developing agent is adhered to a latent image portion of this photosensitive drum by a developing device 203. A recording paper is fed from either a cassette 204 or a cassette 205 at a timing synchronously with the start of radiating the laser beam to convey it to a transfer unit 206 and the developing agent adhered onto the photosensitive drum 202 is transferred onto the recording paper. The recording paper on which the developing agent is adhered is conveyed to a fixing unit 207, and the developing agent is fixed on the recording paper by the heat and compression of the fixing unit 207. The recording paper passing through the fixing unit 207 is discharged by discharging rollers 208. A sorter 220 stores discharged recording papers in each bin for sorting recording papers. If a sorting process is not set, the sorter 220 stores recording papers in the uppermost bin. In a case where recording on both faces is set, the recording paper is conveyed to the discharging rollers 208, then the discharging rollers 208 are inversely rotated such that the recording paper is introduced to a re-feed conveying path by a flapper 209. In a case where a multi-recording is set, the recording paper is introduced to the re-feed conveying path by the flapper 209 such that the recording paper is not conveyed to the discharging rollers 208. The recording paper introduced to the re-feed conveying path is fed to the transfer unit 206 at the above-mentioned timing.

Figure 3:
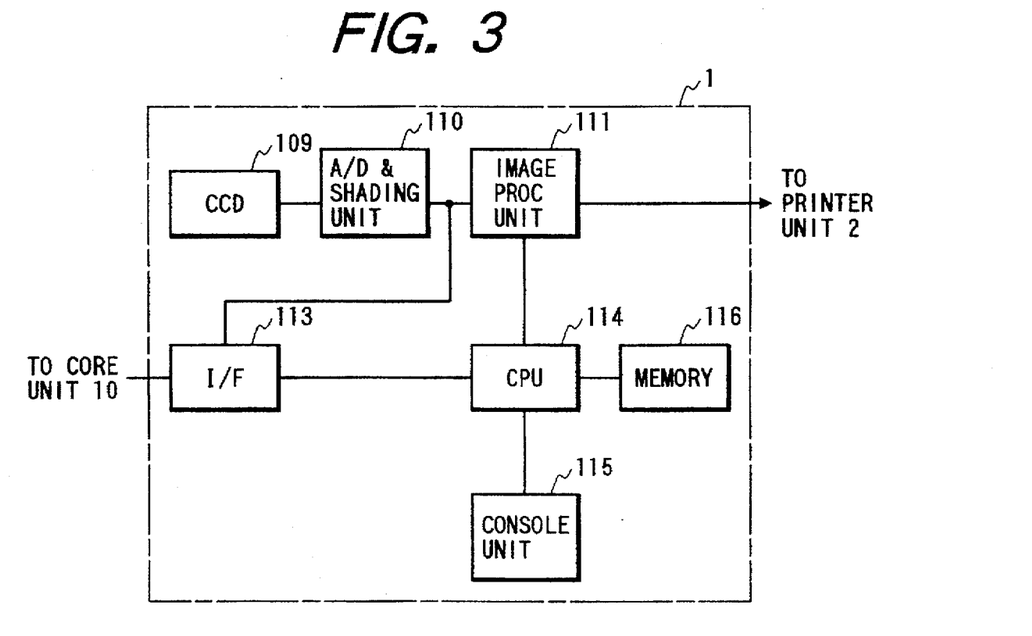
FIG. 3 is a block diagram of a reader unit.

FIG. 3 is a block diagram of the reader unit 1. Image data which is output from the CCD 109 is analog/digital converted and shading corrected in an A/D and shading (A/D.SH) unit 110. Image data processed by the A/D and shading unit 110 is transferred to the printer unit 2 through an image processing unit 111 and is transferred to the core unit 10 of the image input/output control unit 3 through an interface unit 113. A CPU 114 controls the image processing unit 111 and the interface unit 113 in response to the setting contents set in a console unit 115. For example, in a case where a copying mode for performing a copying by executing a trimming process is set in the console unit 115, the trimming process is executed in the image processing unit 111 such that image data is transferred to the printer unit 2. In a case where a facsimile transmission mode is set in the console unit 115, a control command responding to a mode set as image data is transferred to the core unit 10 from the interface unit 113. Thus control program of the CPU 114 is stored in a memory 116 and the CPU 114 performs a control referring to the memory 116. The memory 116 is also used as a work area of the CPU 114.

Figure 4:
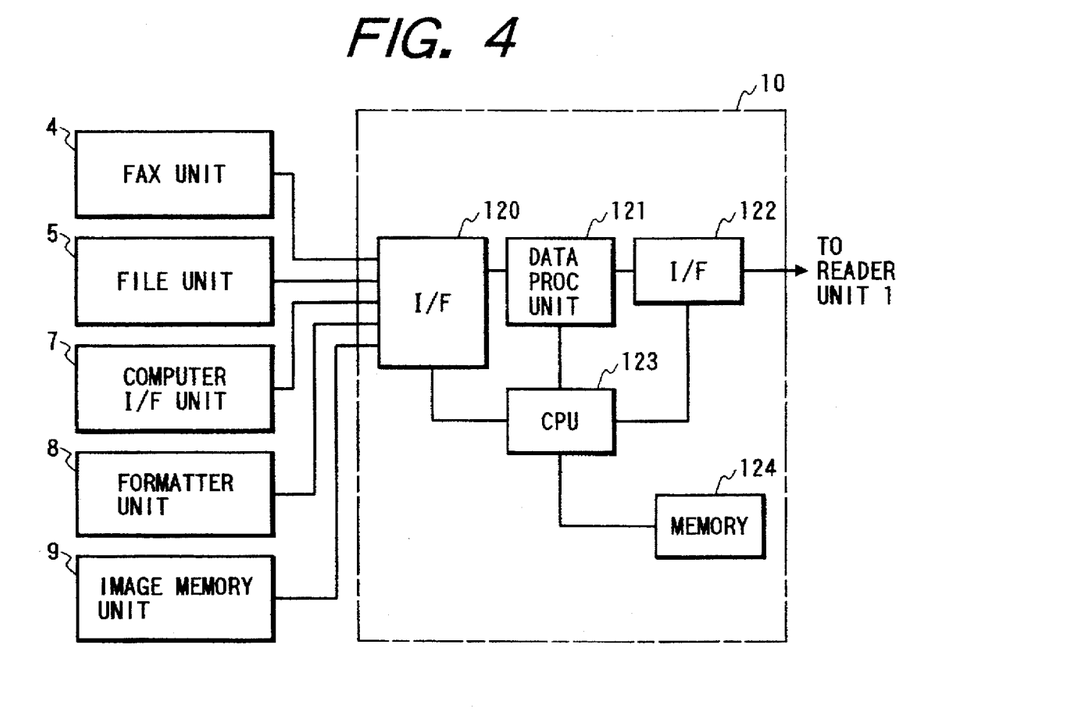
FIG. 4 is a block diagram of a core unit.

FIG. 4 is a block diagram of the core unit 10. Image data from the reader unit 1 is transferred to a data processing unit 121 and a control command from the reader unit 1 is transferred to a CPU 123. The data processing unit 121 executes an image processing such as an image rotating process or an image zooming process. Image data transferred to the data processing unit 121 from the reader unit 1 is transferred to the facsimile unit 4, the file unit 5 and the computer interface unit 7 through an interface 120 in response to the control command transferred from the reader unit 1. Code data representing an image which is input through the computer interface 7 is transferred to the data processing unit 121 and is transferred to the formatter unit 8 to be developed into image data, which is transferred to the data processing unit 121 and is transferred to the facsimile unit 4 or the printer unit 2. Image data from the facsimile unit 4 is transferred to the data processing unit 121 and is transferred to the printer unit 2, the file unit 5 or the computer interface unit 7. Image data from the file unit 5 is transferred to the data processing unit 121 and is transferred to the printer unit 2, the facsimile unit 4 or the computer interface unit 7. The CPU 123 performs the above-mentioned control in accordance with a control program sotred in a memory 124 and the control command transferred from the reader unit 1. The memory 124 is also used as a work area of the CPU 123. In this way, the process which synthesizes such functions as reading of an original image, printing of an image, transmitting/receiving of an image, storing of an image and inputting/outputting of data from a computer can be performed arounding the core unit 10. The CPU 123 of the core unit 10 communicates with the CPU in each unit and can control an operation of each unit.

Next, a data set processing operation of the service and user modes depending on an information inputting sheet (a mark sheet) according to the present invention will be described with referring to FIGS. 5 to 7.

In the present embodiment, as an example, a processing operation by the core unit 10, in a case where a mark sheet for setting data of the service mode is used, will be described.

Figure 5:
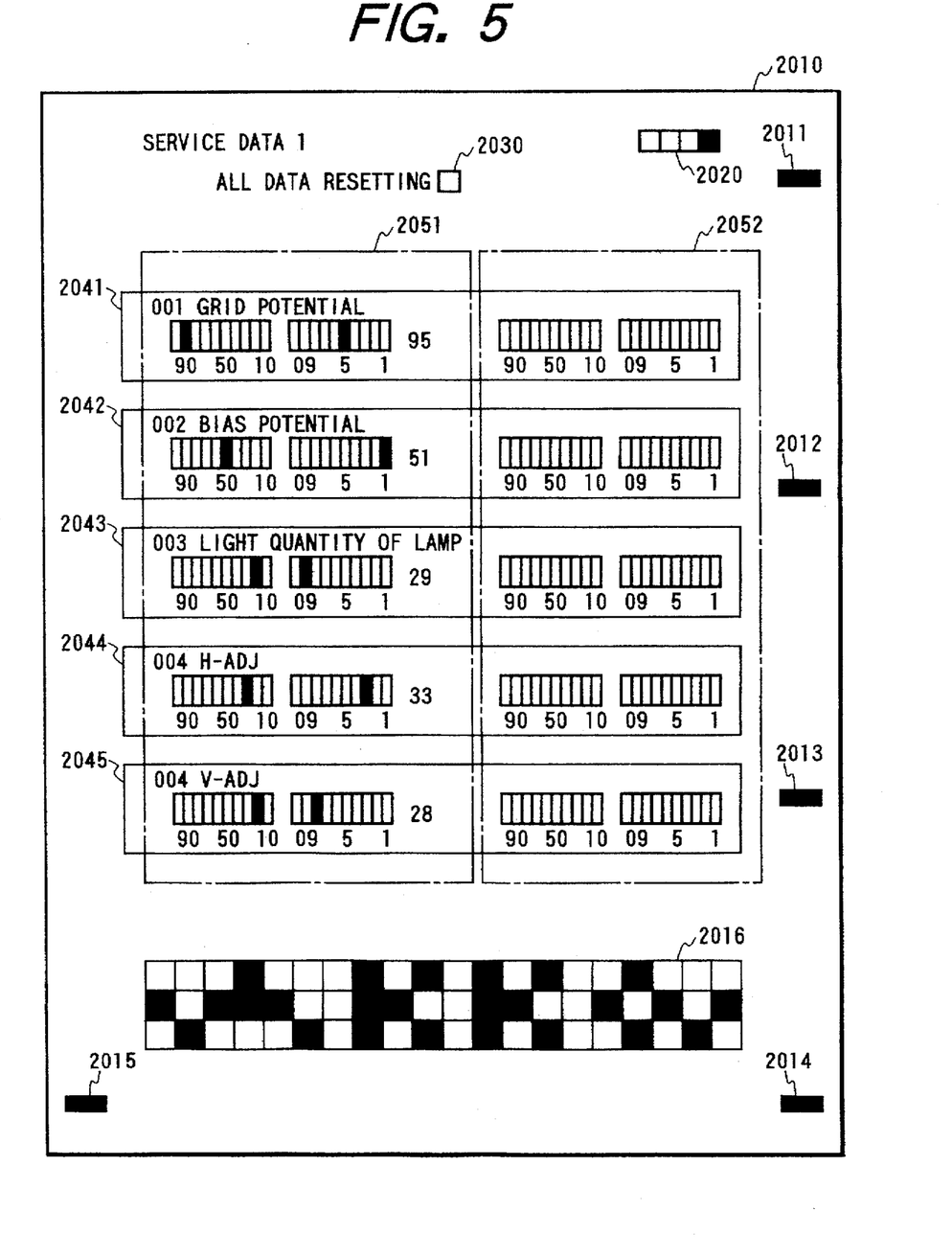
FIG. 5 is a view showing a format of an information inputting sheet for setting data.

FIG. 5 is a view showing a basic format of a mark sheet 2010 for setting an operating condition of an apparatus. Reference numerals 2011 to 2015 denote patterns for performing a detection of a mark sheet, a direction detection of a mark sheet, a positioning of a mark sheet and the like. Reference numeral 2016 denotes a pattern for discriminating the kind of a mark sheet. Reference numeral 2020 denotes a page designation section for designating the page of a mark sheet. Reference numeral 2030 denotes an all data resetting section. Reference numeral 2041 denotes a grid potential setting section for setting the grid potential of a charging device. Reference numeral 2042 denotes a bias potential setting section for setting the bias potential of a developing device. Reference numeral 2043 denotes a lamp light setting section for setting the light quantity of a lamp. Reference numeral 2044 denotes a horizontal position setting section for setting a horizontal position correcting value of an image. Reference numeral 2045 denotes a vertical position setting section for setting a vertical position correcting value of an image. Reference numeral 2051 surrounded by the dotted line denotes an already-setting section of each data indicating data which is set in the image processing apparatus when the information inputting sheet 2010 is printed-out. Reference numeral 2052 denotes a change setting section for marking data when data is change set. Here, an example of setting data (a record outputting characteristic) concerning the quality of an image to be formed is indicated. However, each data of the reference numerals 2041 to 2045 indicated in the present example is only one example. Ordinary, a great number of mechanical adjustment values of an image processing apparatus exist and thus values can not be expressed by one page. Therefore, information inputting sheets of plural pages are provided. In this case, the page designation section 2020 indicates that the intended information inputting sheet is in what page.

FIG. 5 shows an information inputting sheet concerning mechanical adjustment service items depending on individual main image processing apparatuses which are ordinarily set by a service man. However, since setting items of the user mode which are set by an user in accordance with the user's preference such as setting of an initial condition when a power is turned on (default), setting of the sorter mode, setting of a processing method when an error is occurred and the like are tended to increase preparing for varying of apparatus functions, it is effective to use the information inputting sheet in order to perform a setting which concerns setting items of the use mode.

Figure 6:
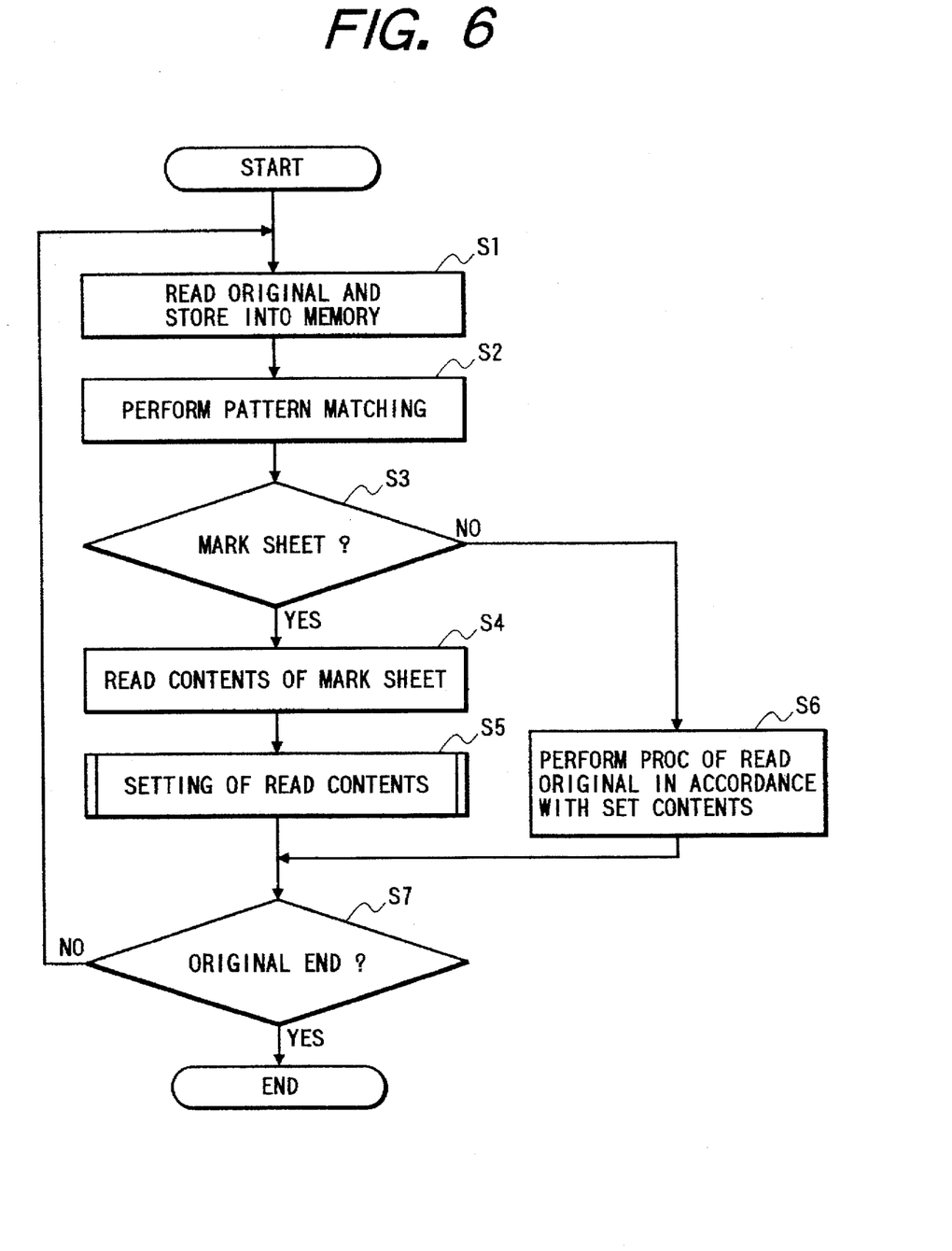
FIGS. 6 and 7 are flow charts showing an operation flow of a data setting process.

FIG. 6 is a flow chart showing a processing procedure utilizing the information inputting sheet shown in FIG. 5. In this flow chart, control is performed by the CPU 123 of the core unit 10 on the basis of a program stored in the memory 124.

At first, in a step S1, by depressing a start key of the console unit 115, the CPU 123 instructs the CPU 114 to read an original image and to transfer the read image data to the image input/output control unit 3. Thereupon, originals are sequentially conveyed onto the platen glass 102 one by one from a sheaf of originals set in the original feeder 101 of the reader unit 1, and an original image is read. Then, the read image data is transferred to the core unit 10, and thereafter, image data is transferred to the image memory unit 9 to be stored.

Next, in a step S2, pattern matching is performed to search to see if patterns 2011 to 2015 exist in the image data stored in the image memory unit 9.

Then, in a step S3, the presence of patterns 2011 to 2015 is discriminated and a pattern 2016 is discriminated by fitting the direction and position by patterns 2011 to 2015 to judge whether the image data stored in the image memory 9 is a predetermined mark sheet by comparing each pattern with a model pattern which is set in the memory 124 in advance. If it is judged that the image data is the predetermined mark sheet, the process proceeds to a step S4, while if it is judged that the image data is not a predetermined mark sheet, the process proceeds to a step S6 by judging it is an another original.

In the step S4, an off-set coordinate of the reference position of each pattern on a judged mark sheet is calculated to read the page designation section 2020, all data resetting section 2030, the grid potential setting section 2041, the bias potential setting section 2042, the lamp light setting section 2043, the setting section 2044 for setting the horizontal position correcting value and the setting section 2045 for setting the vertical position correcting value sequentially. It should be noted that the judgment if a mark is written in a mark section, is performed depending on whether the number of black pixels does or does not exceed a predetermined threshold value by counting the number of black pixels in each mark section. In a step S5, in accordance with the setting contents of a mark section which is read, the CPU 123 supplies an instruction by regarding such contents as respective data of an image processing apparatus and the process proceeds to a step S7 after performing a setting.

If it is judged that the image data is not a predetermined mark sheet in the step S3, an original which is read in accordance with the presently set setting condition is processed in a step S6 to advance to the step S7. Ordinarily, since a copying process is executed, image data of an original image which is read is transmitted to the printer unit 2 to be printed out.

In this way, the CPU 123 judges whether all of a sheaf of sheets set in the original feeder 101 have been read or not in the step S7 by communicating with the CPU 114 of the reader unit 1. If it is judged that originals which have not been read still remain in the original feeder 101, the process is returned to the step S1, and if it is judged that all originals have been read, the process is terminated.

Here, the data setting in the step S5 will be described based on a flow chart shown in FIG. 7.

If it is judged that a mark is written in the all data resetting section 2030 in a step S501, the process proceeds to a step S502 and each of the data of setting sections 2041 to 2045 in the current section 2051 is set. In the step S5, since a setting concerning the quality of an image is performed, the CPU 123 informs an instruction of thus effect to the CPU 114 of the reader unit 1 for performing a setting. Then, the process proceeds to a step S503 to print out an information inputting sheet at the printer unit 2 by recording data on a recording paper in a cassette. This information inputting sheet in which the setting contents set in the step S2 is written in the current-setting section 2051 as a presently-set value can be utilized in a change setting shown in FIG. 5 (marking areas of the all data resetting section 2030 and the change setting section 2052 should be blank).

On the other hand, if a mark is not written in the all data resetting section 2030, the process proceeds to a step S504 to compare each data of the current-setting section 2051 with each data corresponding to each setting item presently set in the image processing apparatus, and if all the data coincide, the process proceeds to a step S505 such that the data change setting can be permitted, and each of the data marked in the change setting section 2052 is discriminated, to perform a setting by supplying an instruction to the CPU (CPU 114 in the present embodiment) which controls a portion to be set. Then, the process proceeds to a step S506 to print out an information inputting sheet, which can be utilized in the change setting, at the printer unit 2 as in the case of the step S503 by regarding the setting contents set in a step S505 as the presently-setting value.

In the step S504, if it is judged that even one of data differs, notification of an error is provided by displaying that the presently-set data differs from data in the current-setting section 2051 on a display unit provided in the console unit 115 to print out the information inputting sheet, which can be utilized in the change setting in which the presently-set setting value is marked in the current-setting section 2051, at the printer unit 2 as in the cases of the steps S503 and S506.

The foregoing operation is performed by control of the CPU 123 on the basis of a program stored in the memory 124. However, the CPU 114 may perform control by storing an operation program in the memory 116 of the reader unit 1. An operation may also be performed by another device by storing the operation program in a memory such as a detachable floppy disk or the like.

According to the above-mentioned embodiment of the present invention, the complex and various adjustments in the service mode such as data adjustment in the image processing apparatus concerning the quality of an image when an image is formed can be easily and quickly performed. Further, since change data can be set by comparing it with the current-setting value, an accurate setting can be performed. Also, if data of the current-setting section differs from the presently-set value, since an error is displayed, more accurate setting can be performed. Even if a memory which stores setting data is erroneously cleared or the stored contents are destroyed, the current-setting value can be easily reset by reading the information inputting sheet in which information is marked on the all data resetting section. The reader unit and the printer unit can be used in both ordinary original reading and image recording. Also, as to the information inputting sheet, since information is to be recorded on a recording paper which is ordinary used for recording an image, it is possible to suppress cost increase.

In the above-mentioned embodiment, the process is executed in the service mode, however, in the ordinary copy mode, a copying is directly performed without storing data in a memory for a moment.

It is possible to perform a copying with the varied copying characteristic every original (used for a test print) utilizing the information inputting sheets which are forcedly copied for plural pages by an instruction or the like from the console unit 115. That is, a copying characteristic of an original which is to be read after performing a setting by the information inputting sheet can be varied by inserting an information inputting sheet on which the setting value is marked between sheaf of papers and another sheaf of papers.

Figure 7:
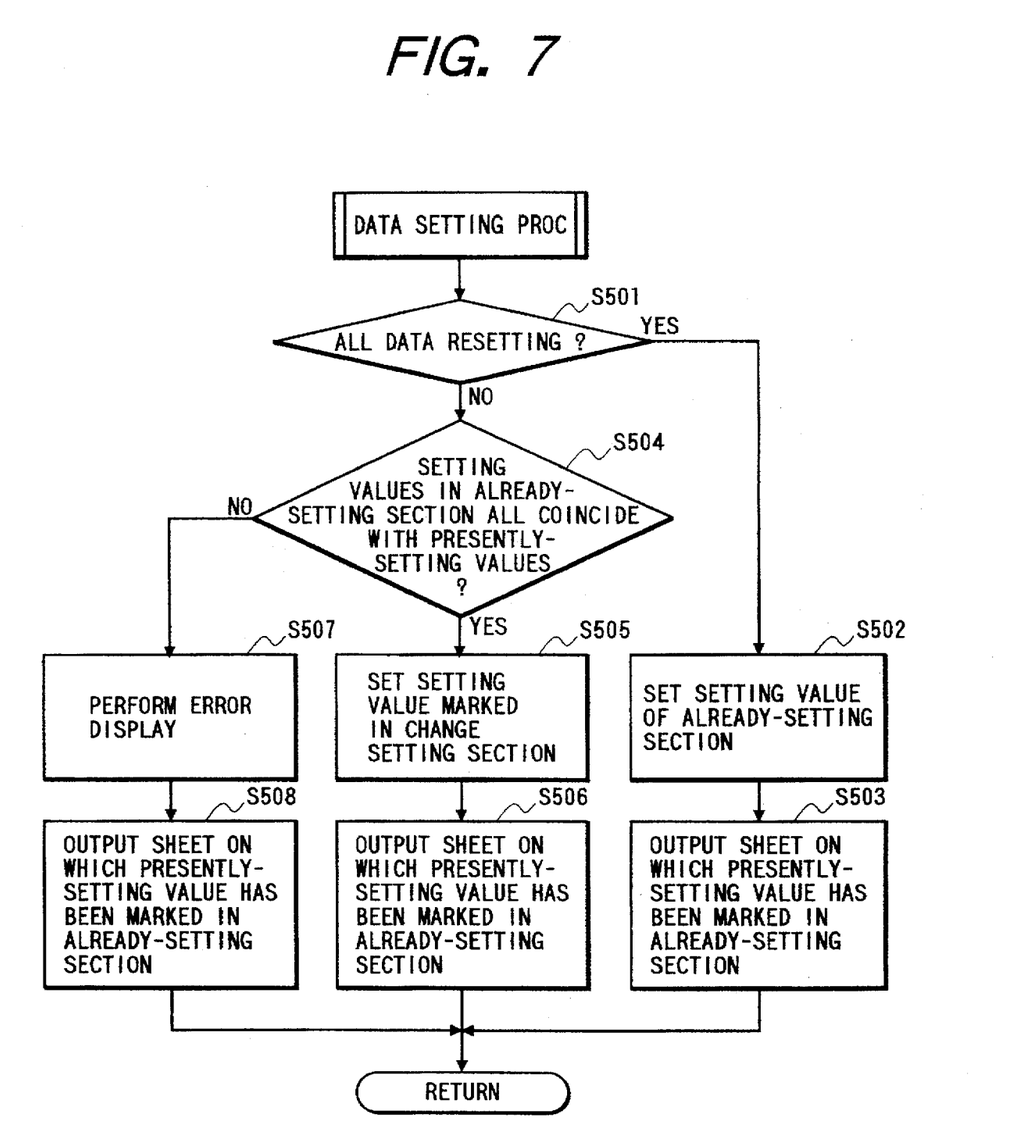

In a step S507 of FIG. 7, if an error is displayed, change setting data is treated as unavailable data, however, a change setting may be performed if it is required by an instruction from an user by informing a confirmation to a user whether the change is required or not by a display or the like.

Since the information inputting sheet which can be utilized in the change setting marked the presently-set value is printed out after performing a setting process, the change setting can be quickly performed again and the presently-set value can be easily confirmed.

It should be noted that an information inputting sheet is described as an ordinarily-used mark sheet in the above-mentioned embodiment. However, the application of the present invention is not limited to such a mark sheet but may be a sheet on which an optically readable mark can be printed as an information inputting sheet if an image processing apparatus has an optical image reading means, and the same process can be executed by utilizing the number, the character or the like.

As described above, according to the present invention, data concerning a user mode or a service mode in an image processing apparatus can be accurately and speedily changed and reset by utilizing an information inputting sheet.

As above, the present invention is described based on the preferable embodiments, however, the present invention is not limited to the present embodiment, but can be modified in various manners within the scope of the following claims.

What is claimed is:

1. An image processing apparatus comprising:
   reading means for reading data from an information inputting sheet;
   discrimination means for discriminating the data read by said reading means;
   setting means for setting a predetermined setting item on the basis of the data discriminated by said discrimination means; and
   output means for printing and outputting the information inputting sheet on which the data set by said setting means is marked,
   wherein the information inputting sheet has a first data section in which presently-set data set by said setting means has been marked and a second data section in which setting can be changed.

2. An apparatus according to claim 1, wherein said setting means performs a setting on the basis of data marked in the second data section of the information inputting sheet.

3. An apparatus according to claim 1, further comprising determination means for determining whether or not the presently-set data coincides with data marked in the first data section of the information inputting sheet, wherein if it is determined that the presently-set data does not coincide with the data marked in the first data section in said determination means, said setting means does not perform a setting.

4. An apparatus according to claim 3, wherein if it is determined that the presently-set data does not coincide with the data marked in the first data section in said determination means, said output means prints and outputs the information inputting sheet on which the presently-set data is marked.

5. An image processing apparatus comprising:
   reading means for reading data from an information inputting sheet;
   discrimination means for discriminating the data read by said reading means;
   setting means for setting a predetermined setting item on the basis of the data discriminated by said discrimination means; and
   output means for outputting image data,
   wherein said setting means sets the setting item for adjustment of an output characteristic of said output means.

6. An apparatus according to claim 5, wherein an original image different from the information inputting sheet is read in said reading means to output it by said output means so that a copying of the original can be performed.

7. An apparatus according to claim 5, wherein said output means outputs an information inputting sheet which shows data as set by said setting means.

8. An image processing apparatus comprising:
   reading means for reading an information inputting sheet;
   image formation means for forming an image; and
   setting means for setting data concerning a quality of the image formed by said image formation means by utilizing data which is obtained form said reading means,
   wherein said setting means sets a setting value for the image forming process by said image formation means.

9. An apparatus according to claim 8, wherein said image formation means forms an image which is read by said reading means.

10. An image processing method comprising the steps of:
    reading data from an information inputting sheet;
    discriminating the data read in said reading step;
    setting a predetermined setting item on the basis of the data discriminated in said discriminating step; and
    print-outputting the information inputting sheet on which the data set in said setting step is marked,
    wherein the information inputting sheet to be output in said print-outputting step has a first data section in which presently-set data set in said setting step has been marked and a second data section in which setting can be changed.

11. A method according to claim 10, wherein said setting step includes performing a setting on the basis of data marked in the second data section of the information inputting sheet.

12. A method according to claim 10, further comprising the step of determining whether the presently-set data coincides with data marked in the first data section of the information inputting sheet,
    wherein if it is determined that the presently-set data does not coincide with the data marked in the first data section in said determining step, a setting is not performed in said setting step.

13. A method according to claim 12, wherein if it is determined that the presently-set data does not coincide with the data marked in the first data section in said determining step, an information inputting sheet on which the presently setting data is marked is print output in said output step.

14. An image processing method comprising the steps of:

reading data from an information inputting sheet;

discriminating the data read in said reading step;

setting a predetermined setting item on the basis of the data discriminated in said discrimination step; and outputting image data by using an output means, wherein the setting item for adjustment of an output characteristic of the output means is set in said setting step.

15. A method according to claim 14, wherein an original image different from the information inputting sheet is read in said reading step to output it in said output step so that a copying of an original can be performed.

16. A method according to claim 14, wherein the information inputting sheet to which data set in said setting step is input is output in said output step.

17. An image processing apparatus comprising:

reading means for reading data from an information inputting sheet;

discrimination means for discriminating the data read by said reading means;

setting means for setting a predetermined setting item on the basis of the data discriminated by said discrimination means; and output means for outputting the information inputting sheet on which presently-set data set by said setting means is marked.

18. An apparatus according to claim 17, wherein said setting means changes the present setting by causing said reading means to read the information inputting sheet on which a mark other than the presently-set data is input by an operator.

19. An apparatus according to claim 17, wherein said output means outputs the data read by said reading means when data other than the information inputting sheet is read by said reading means.

20. An image processing method comprising the steps of:

reading data from an information inputting sheet;

discriminating the data read in said reading step;

setting a predetermined setting item on the basis of the data discriminated in said discrimination step; and outputting an information inputting sheet on which presently-set data set in said setting step is marked.

21. A program for causing a programmable apparatus loaded with said program to execute an image processing method comprising the steps of:

reading data from an information inputting sheet;

discriminating the data read in said reading step;

setting a predetermined setting item on the basis of the data discriminated in said discrimination step; and outputting an information inputting sheet on which presently setting data set in said setting step is marked.

* * * * *

UNITED STATES PATENT AND TRADEMARK OFFICE
CERTIFICATE OF CORRECTION

PATENT NO. : 5,729,350
DATED : March 17, 1998
INVENTOR(S) : HIDENORI OZAKI

It is certified that error appears in the above-identified patent and that said Letters Patent is hereby corrected as shown below:

<u>IN THE DRAWINGS</u>

Sheet 6, Fig. 7, "ALREADY-SETTING" (all occurrences) should read --CURRENT SETTING--.

<u>COLUMN 1</u>

Line 31, "like," should read --like.--; and
Line 33, "increasing of" should read --increases in--.

<u>COLUMN 4</u>

Line 14, "arounding" should read --using--.

<u>COLUMN 7</u>

Line 11, "between" should read --between one--.

<u>COLUMN 8</u>

Line 31, "form" should read --from--.

Signed and Sealed this

Eighth Day of September, 1998

Attest:

BRUCE LEHMAN

*Attesting Officer*     *Commissioner of Patents and Trademarks*